United States Patent
Sivanesan et al.

(10) Patent No.: US 9,037,157 B2
(45) Date of Patent: May 19, 2015

(54) METHOD AND APPARATUS FOR PROVIDING ACCURATE MOBILITY STATE ESTIMATION IN HETEROGENEOUS NETWORKS BASED ON COORDINATED RADIAL SPEED ESTIMATION

(71) Applicant: Alcatel-Lucent USA Inc., Murray Hill, NJ (US)

(72) Inventors: Kathiravetpillai Sivanesan, Richardson, TX (US); Jialin Zou, Randolph, NJ (US); Subramanian Vasudevan, Morristown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 38 days.

(21) Appl. No.: 13/743,823

(22) Filed: Jan. 17, 2013

(65) Prior Publication Data
US 2014/0200022 A1    Jul. 17, 2014

(51) Int. Cl.
*H04W 64/00*    (2009.01)

(52) U.S. Cl.
CPC .................................. *H04W 64/006* (2013.01)

(58) Field of Classification Search
CPC ... H04W 36/32; H04W 64/00; H04W 64/006; H04W 4/046; H04W 52/367; G01S 5/12; G01S 13/84; G01S 19/52; G01S 2205/008; G01S 3/40
USPC ................................................ 455/456.1–459
See application file for complete search history.

(56) References Cited

U.S. PATENT DOCUMENTS

| | | | | |
|---|---|---|---|---|
| 6,639,554 | B2 * | 10/2003 | Kim et al. | 342/457 |
| 2011/0080825 | A1 | 4/2011 | Dimou et al. | |
| 2012/0101723 | A1 * | 4/2012 | Kendall et al. | 701/433 |
| 2012/0129528 | A1 * | 5/2012 | Kobayashi | 455/436 |
| 2014/0099962 | A1 * | 4/2014 | Capdevielle et al. | 455/441 |

FOREIGN PATENT DOCUMENTS

EP    2528371 A1    11/2012

OTHER PUBLICATIONS

PCT International Search Report dated Sep. 3, 2014 for PCT/US2014/010396.
International Search Report for International Application No. PCT/US2014/010396 mailed Jul. 1, 2014.

(Continued)

*Primary Examiner* — Chuong A Ngo
(74) *Attorney, Agent, or Firm* — Harness, Dickey & Pierce, P.L.C.

(57) ABSTRACT

A method of determining a mobility state of a user equipment (UE) in a wireless communications network, the method comprising: obtaining, at a first device, a first speed measurement, the first speed measurement being a measurement of a radial speed of the UE relative to a first network element; obtaining, at the first device, one or more second speed measurements corresponding, respectively, to one or more second network elements, each of the one or more second speed measurements being a measurement of a radial speed of the UE relative to the corresponding one of the one or more second network elements; generating, at the first device, a comparison result based on the first speed measurement and the one or more second speed measurements; and determining the mobility state of the UE based on the comparison result.

20 Claims, 5 Drawing Sheets

(56) References Cited

OTHER PUBLICATIONS

Alcatel-Lucent et al., "Alternative Speed Estimation Solutions for Improving MSE," 3GPP TSG-RAN WG2 meeting #81bis, Chicago, USA, Apr. 15-19, 2013.

Renesas Mobile Europe Ltd., "Summary of email discussion [77#33] LTE: Mobility State Estimation Enhancements," 3GGPP TSG-RAN WG2 #77bis, Mar. 26-30, 2012, Jeju, Korea.

Alcatel-Lucent et al., "Discussion on UE based speed estimation for improving the mobility performance in HetNets," 3GPP TSG RAN WG2 Meeting #81bis, Chicago, USA, Apr. 15-19, 2013.

* cited by examiner

METHOD AND APPARATUS FOR PROVIDING ACCURATE MOBILITY STATE ESTIMATION IN HETEROGENEOUS NETWORKS BASED ON COORDINATED RADIAL SPEED ESTIMATION

BACKGROUND

1. Field

Example embodiments relate generally to determining mobility states of mobiles is wireless networks.

2. Related Art

Heterogeneous wireless networks (HetNets) include macro base stations (BSs) and small cell base stations BSs, for example pico BSs or femto BSs. Macro base stations provide wireless coverage for user equipment (UEs) within large geographical areas, while small cell BSs may be underlaid with respect to the macro BSs in order to provide wireless coverage for UEs located in smaller geographical areas within the coverage area of a macro BS. The ability to evaluate the mobility states of mobiles in a HetNet facilitates the operation of optimizing the performance of the HetNet.

SUMMARY

According to at least one example embodiment, a method of determining a mobility state of a user equipment (UE) in a wireless communications network includes obtaining, at a first device, a first speed measurement, the first speed measurement being a measurement of a radial speed of the UE relative to a first network element; obtaining, at the first device, one or more second speed measurements corresponding, respectively, to one or more second network elements, each of the one or more second speed measurements being a measurement of a radial speed of the UE relative to the corresponding one of the one or more second network elements; generating, at the first device, a comparison result based on the first speed measurement and the one or more second speed measurements; and determining the mobility state of the UE based on the comparison result.

The first device may be the first network element, and the first network element and the one or more second network elements may each be enhanced Node Bs (eNB)s.

The generating a comparison result may include selecting a largest speed measurement from among the first speed measurement and the one or more second speed measurements, and the determining the mobility state of the UE may include determining the mobility state of the UE to be a speed indicated by the selected speed measurement.

The obtaining a first speed measurement may include generating the first speed measurement by measuring the radial speed of the UE at the first network element, and the obtaining one or more second speed measurements may include, for each of the one or more second speed measurements, receiving the second speed measurement at the first network element from the corresponding one of the one or more second network elements.

The first device is the UE, and the first network element and the one or more second network elements may each be enhanced Node Bs (eNB)s.

The generating a comparison result may include selecting a largest speed measurement from among the first speed measurement and the one or more second speed measurements, and the determining the mobility state of the UE may include determining the mobility state of the UE to be a speed indicated by the selected speed measurement.

The obtaining a first speed measurement includes generating the first speed measurement by measuring, at the UE, the radial speed of the UE relative to the first network element, and The obtaining one or more second speed measurements may include, for each of the one or more second speed measurements, generating the second speed measurement by measuring, at the UE, the radial speed of the UE relative to the second network element that corresponds to the second speed measurement.

The obtaining a first speed measurement may include receiving the first speed measurement, at the UE, from the first network element, and the obtaining one or more second speed measurements may include, for each of the one or more second speed measurements, receiving the second speed measurement at the UE from the second network element that corresponds to the second speed measurement.

According to at least one example embodiment, a method of determining a velocity of a user equipment (UE) in a communications network may include obtaining, at a first device, a first angle $\beta$, the first angle $\beta$ being an angle between a first line and a direction of the velocity of the UE, the first line being a line of sight between a position of the UE and a position of a network element; obtaining, at the first device, a radial speed of the UE relative to the network element; and determining, at the first device, the velocity of the UE based on the radial speed and the first angle $\beta$.

The first device may be the network element, and the network element may be an enhanced Node B (eNB).

The method may further include receiving, at the network element, spatial information indicating a position of the UE, wherein the first angle $\beta$ is generated based on a position of the network element and the position of the UE.

The obtaining a radial speed of the UE may include measuring, at the network element, the radial speed of the UE relative to the network element.

The first device may be the UE.

The method may further include receiving, at the UE, spatial information indicating a position of the network element, wherein the first angle $\beta$ is generated based on a position of the UE and the position of the network element.

According to at least one example embodiment, a communications device may include a processor configured to control operations for determining a mobility state of a user equipment (UE) in a communications network, the operations including, obtaining, at the communications device, a first speed measurement, the first speed measurement being a measurement of a radial speed of the UE relative to a first network element; obtaining, at the communications device, one or more second speed measurements corresponding, respectively, to one or more second network elements, each of the one or more second speed measurements being a measurement of a radial speed of the UE relative to the corresponding one of the one or more second network elements; generating, at the communications device, a comparison result based on the first speed measurement and the one or more second speed measurements; and determining the mobility state of the UE based on the comparison result.

The communications device may be the first network element, and the first network element and the one or more second network elements may each be enhanced Node Bs (eNB)s.

The communications device may be the UE, and the first network element and the one or more second network elements may each be enhanced Node Bs (eNB)s.

According to at least one example embodiment, a communications device may include a processor configured to control operations for determining a velocity of a user equipment (UE) in a communications network, the operations including, obtaining, at the communications device, a first angle β, the first angle β being an angle between a first line and a direction of the velocity of the UE, the first line being a line of sight between a position of the UE and a position of a network element; obtaining, at the communications device, a radial speed of the UE relative to the network element; and determining, at the communications device, the velocity of the UE based on the radial speed and the first angle β.

The communications device may be the network element, and the network element may be an enhanced Node B (eNB).

The communications device may be the UE.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
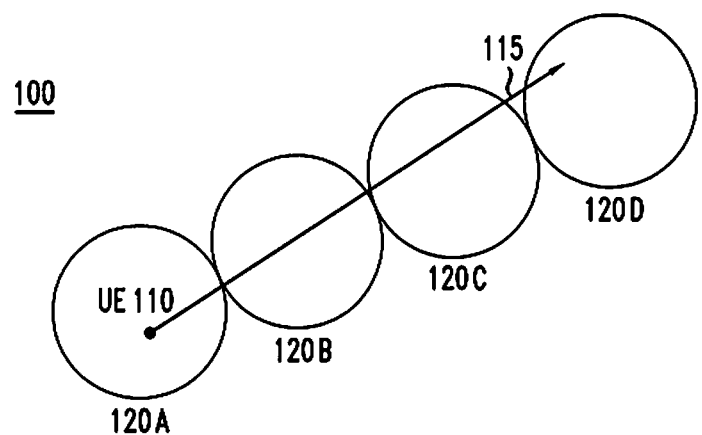
FIG. 1A is a diagram for explaining a method of counting cells to estimate a mobility state of a user equipment (UE).

Various at least one example embodiment will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile, mobile unit, mobile station, mobile user, access terminal (AT), subscriber, user, remote station, access terminal, receiver, etc., and may describe a remote user of wireless resources in a wireless communication network. The term enhanced Node B (eNB) may be considered synonymous to, and/or referred to as, an evolved Node B, base station (BS), base transceiver station (BTS), Node B, access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes. Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Mobility State Estimation

Some methods of performing mobility state estimation, for example in the releases 8, 9, and 10 of the long-term evolution (LTE) standards, are based on counting the number of cells a user equipment (UE) passes through in a period of time, for example, by counting a number of handover operations the UE experiences between different cells. Mobility state estimation is accomplished by comparing the number of cells counted against thresholds to estimate, for example, a speed at which the UE traveling. The method of counting cells is suitable for determining mobility states in a legacy homogeneous network.

For example, FIG. 1A is a diagram for explaining a method of counting cells to estimate a mobility state of a UE. FIG. 1A illustrates a portion of a wireless communications network 100. The wireless communications network 100 may follow, for example, the long term evolution (LTE) protocol. The wireless communication network 100 may also include a plurality of UEs including a UE 110, and four macro cells, first through fourth macro cells 120A-120D. The wireless communications network includes no small cells. Accordingly, the wireless communications network 100 is an example of a homogenous network.

Though not pictured, for each macro cell 120A-120D, there is a corresponding evolved Node B (eNB) which provides wireless access for UEs within the geographical coverage area of the cell. As used herein, the term cell may be considered synonymous with, and sometimes referred to as, the eNB corresponding to the cell. Each of the first through fourth macro cells 120A-120D may provide wireless coverage for UEs within the geographical regions associated with the first through fourth macro cells 120A-120D. The UE 110 may be, for example, a mobile phone, smart phone, computer, or personal digital assistant (PDA).

Referring to FIG. 1A, the UE 110's movement of over time is indicated by the arrow 115. Accordingly, as is illustrated in FIG. 1, through a series of handover operations, the UE 110 may connect to each of the macro cells 120A-120D, sequentially, in a given amount of time. The number of cells the UE 110 connects to over the given amount of time may be counted by a network element including, for example, a mobility management entity (MME) (not pictured) which can determine a mobility state of the UE 110 by comparing the counted number of cells to various thresholds.

Heterogeneous networks (HetNets) include macro cells and small cells underlaid with respect to the macro cells. In a HetNet, each small cell may vary in size with respect to the macro cells and other small cells. Further, small cells underlaid in the same macro cell may substantially overlap one another, for example, in high traffic areas within the coverage area of the macro cell. Accordingly, the spacing and sizing of cells in HetNets may be less uniform than the spacing and sizing of cells in a homogenous network. Consequently, the accuracy of the mobility state estimation provided by the method of counting cells may be reduced for HetNets, with respect to homogenous networks.

Figure 1B:
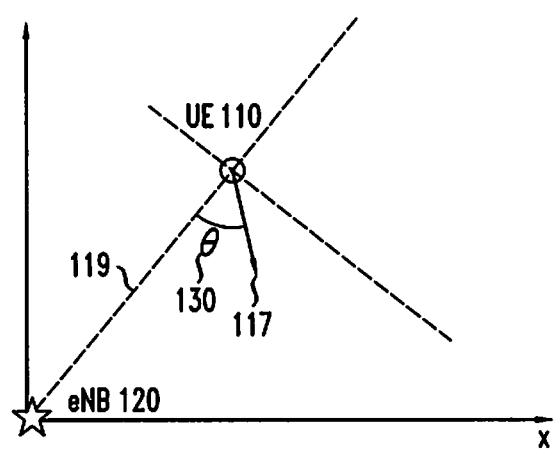
FIG. 1B is a diagram illustrating the use of Doppler spread to estimate a mobility state of a UE.

Doppler spread estimation is another method of performing mobility state estimation. According to known methods, Doppler spread techniques may be used to determine the radial speed of a UE with respect to a measurement point including, for example, an eNB. For example, FIG. 1B is a diagram illustrating the use of Doppler spread to estimate a mobility state of a UE. FIG. 1B illustrates the UE 110 and the first eNB 120A. As is illustrated in FIG. 1B, in accordance with known methods, by monitoring signals sent to and/or received from the UE 110, the first eNB 120A is capable of determining a radial speed of the UE 110 with respect to the geographical location of the first eNB 110A. In accordance with known methods, the radial speed determined by the first eNB 110A may be used to estimate a linear speed, of mobility state, of the UE 110.

Because the Doppler spread method relies on the use of radial speed, and not cell counting, the varying sizes and spacing of cells in HetNets do not cause the same problems with the Doppler spread method as those described above with respect to the cell counting method. Accordingly, the Doppler spread mobility state estimation method may be more useful in HetNets than the cell counting mobility state estimation method. However, referring again to FIG. 1B, an angle θ, referred to herein as an approach angle 130, exists between a direction of motion 117 of the UE 110 and a line of sight 119 between the first eNB 120A and the UE 110. Further, as the approach angle 130 increases to 90°, the accuracy of the mobility state estimation provided by the Doppler spread method decreases. For example, if the direction of motion 117 of the UE 110 is perpendicular to the line of sight 119, therefore making the approach angle 90°, the radial speed of the UE 110 with respect to the first eNB 110A is 0, regardless of the linear speed of the UE with respect to the direction of motion 117. Consequently, as the approach angle 130 nears 90°, the accuracy and usefulness of the mobility state estimation provided by the Doppler spread method becomes minimal.

Accordingly, it may be desirable to use a mobility state estimation method which is effective for HetNets and avoids the problems with the Doppler spread method discussed above. Apparatuses and methods for providing accurate mobility state estimation in HetNets based on coordinated radial speed estimation will now be discussed below.

Overview of Apparatuses for Providing Mobility State Estimation in HetNets.

Figure 2A:
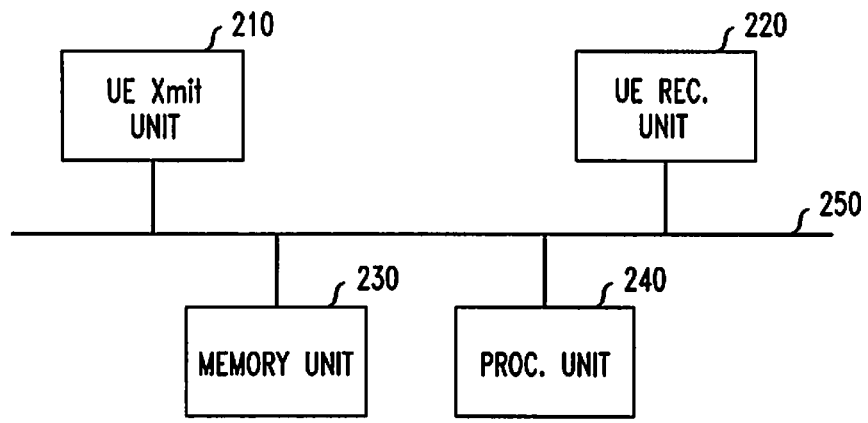
FIG. 2A is a diagram illustrating an example structure of a UE according to example embodiments.

FIG. 2A is a diagram illustrating an example structure of a UE 201. Any UE described herein may have the structure and operation of the UE 201 described below. The UE 201 may include, for example, a UE transmitting unit 210, a UE receiving unit 220, a memory unit 230, a processing unit 240, and a data bus 250.

The UE transmitting unit 210, UE receiving unit 220, memory unit 230, and processing unit 240 may send data to and/or receive data from one another using the data bus 250. The UE transmitting unit 210 is a device that includes hardware and any necessary software for transmitting wireless signals on an uplink (reverse link) channel including, for example, data signals or control signals, via one or more wireless connections to other wireless devices (e.g., eNBs).

The UE receiving unit 220 is a device that includes hardware and any necessary software for receiving wireless signals on a downlink (forward link) channel including, for example, data signals or control signals, via one or more wireless connections from other wireless devices (e.g., eNBs).

The memory unit 230 may be any storage medium capable of storing data including, for example, magnetic storage, flash storage, etc.

The processing unit 240 may be any device capable of processing data including, for example, a microprocessor configured to carry out specific operations based on input data, or capable of executing instructions included in computer readable code including, for example, code stored in the memory unit 230.

According to at least one example embodiment, operations described herein, for example with reference to any of FIGS. 1-6, as being performed by a UE may be performed by the UE 201 having the structure illustrated in FIG. 2A. For example, the memory unit 230 may store executable instructions corresponding to each of the operations described herein as being performed by a UE. Further, the processing unit 240 may be configured perform each of the operations described herein as being performed by a UE, for example, by executing executable instructions stored in the memory unit 230.

Figure 2B:
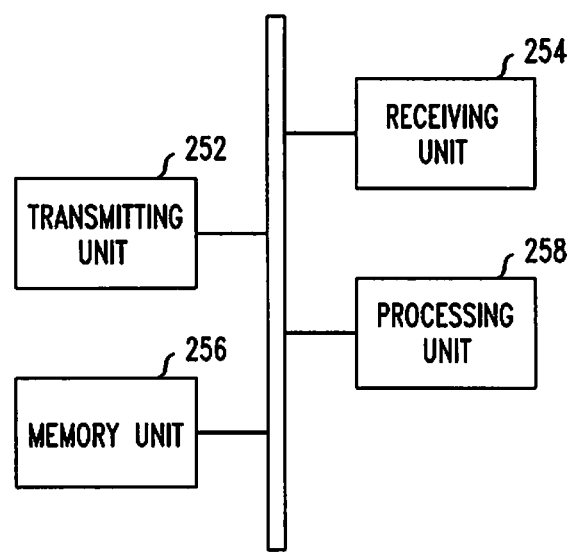
FIG. 2B is a diagram illustrating an example structure of the evolved Node B (eNB) according to example embodiments.

FIG. 2B is a diagram illustrating an example structure of the eNB 251. Any eNB described herein may have the structure and operation of the eNB 251 described below. Referring to FIG. 2B, the eNB 251 may include, for example, a data bus 259, a transmitting unit 252, a receiving unit 254, a memory unit 256, and a processing unit 258.

The transmitting unit 252, receiving unit 254, memory unit 256, and processing unit 258 may send data to and/or receive data from one another using the data bus 259.

The transmitting unit 252 is a device that includes hardware and any necessary software for transmitting signals including, for example, control signals or data signals via one or more wired and/or wireless connections to other network element.

The receiving unit 254 is a device that includes hardware and any necessary software for receiving wireless signals including, for example, control signals or data signals via one or more wired and/or wireless connections to other network elements.

The memory unit 256 may be any device capable of storing data including magnetic storage, flash storage, etc.

The processing unit 258 may be any device capable of processing data including, for example, a microprocessor configured to carry out specific operations based on input data, or capable of executing instructions included in computer readable code including, for example code stored in the memory unit 256.

According to at least one example embodiment, operations described herein, for example with reference to any of FIGS. 1-6, as being performed by an eNB may be performed by the eNB 251 having the structure illustrated in FIG. 2B. For example, the memory unit 256 may store executable instructions corresponding to each of the operations described herein as being performed by an eNB. Further, the processing unit 258 may be configured perform each of the operations described herein as being performed by a eNB, for example, by executing executable instructions stored in the memory unit 256.

Example methods for estimating a mobility state of a UE in a HetNet will now be discussed in greater detail below.

Multi-Node Coordinated Speed Estimation

Figure 3:
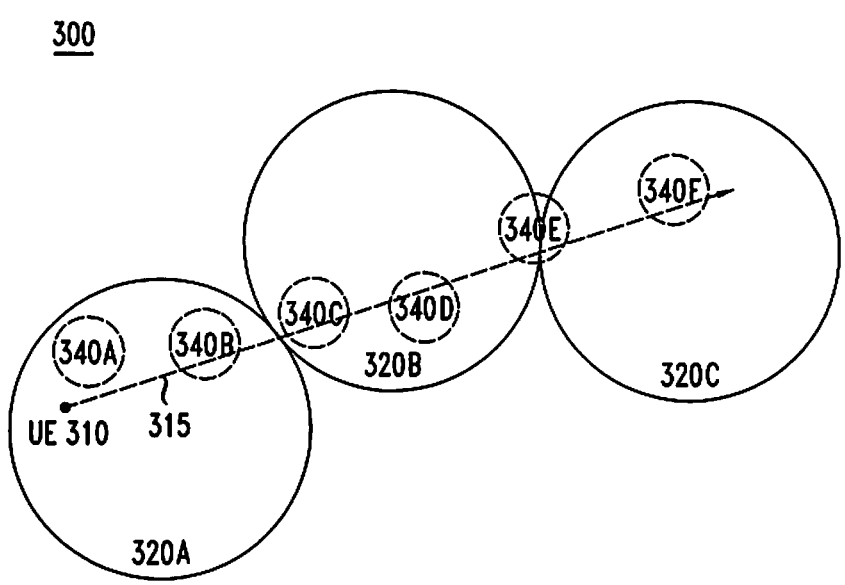
FIG. 3 is a diagram for explaining multi-node coordinated speed estimation according to at least one example embodiment.

FIG. 3 is a diagram for explaining multi-node coordinated speed estimation according to at least one example embodiment. FIG. 3 illustrates a portion of a wireless communications network 300 in accordance with example embodiments. The wireless communications network 300 may follow, for example, the LTE protocol. The wireless communications network 300 is a HetNet which includes both first through third macro cells 320A-C and first through sixth small cells 340A-F. Each of small cells 340A-F may be, for example, a femto cell or a pico cell. The wireless communication network 300 may also include a plurality of UEs including the UE 310.

As is discussed above, the known Doppler spread mobility state estimation technique allows an eNB to determine a radial speed of a UE. At the same time, when an approach angle of the UE nears 90°, the detectability of the speed of the UE at the eNB becomes low. However, when the number of eNBs measuring the speed of the UE is increased to, for example, two, the chance that the detectability of the UE's speed is low at both the measuring eNBs is reduced, because the chance that the approach angle of the UE is at or near 90° for both the measuring eNBs is small. Further, as the number of measuring eNBs is further increased, the chance that the speed of the UE is undetectable at all the measuring UEs is further reduced.

The above-referenced observation is illustrated in FIG. 3 by the arrow 315 which illustrates the movement of the UE 310 through the wireless communications network 300 over time. As is illustrated in FIG. 3, the varied positions of the macro cells 320A-C and small cells 340A-F make it unlikely that at any point on the path 315, the approach angle of the UE 310 will be at or near 90° for more than one cell. Accordingly, the varied positions of the macro cells 320A-C and small cells 340A-F provide the feature of making it unlikely that the speed of the UE 110 will be undetectable, or difficult to detect, by more than one cell due to the approach angle being at or near 90°. A method of estimating the mobility state of a UE in accordance with example embodiments takes advantage of the above-referenced feature by making use of multiple radial speed measurements using multiple measurement points. As will be discussed in greater detail below with reference to FIGS. 4 and 5, in accordance with example embodiments, the mobility state estimation can be performed at an eNB or at a UE.

Figure 4:
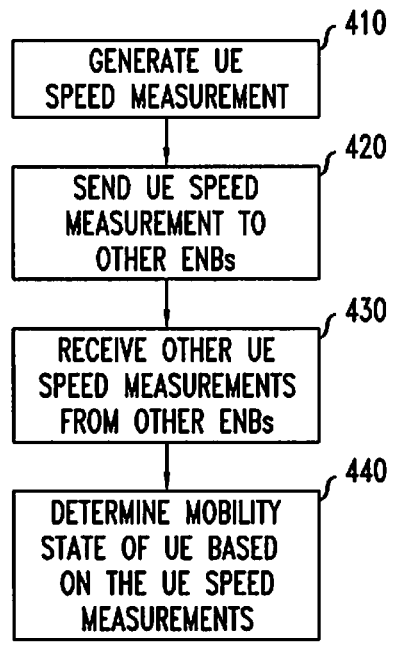
FIG. 4 is a flow chart illustrating a method of estimating the mobility state of a UE at an eNB using coordinated speed estimation in accordance with at least one example embodiment.

For example, FIG. 4 is a flow chart illustrating a method of estimating the mobility state of a UE at an eNB using coordinated speed estimation in accordance with at least one example embodiment. FIG. 4 will be discussed below with reference to the first small cell 340A. However, according to at least one example embodiment, each of the operations discussed below with reference to the first small cell 340A may be performed by any of the cells in the wireless communications network 300.

Referring to FIG. 4, in step S410 the first small cell 340A generates a speed measurement of the UE 310. For example, the first small cell 340A may determine, as the speed measurement, a radial speed of the UE 310 with reference to the first small cell 340A using the Doppler spread technique in accordance with known methods.

In step S420, the first small cell 340A sends the speed measurement generated in step S410 to one or more other eNBs. For example, the first small cell 340A may send the speed measurement generated in step S410 to any or all of the first through fourth macro cells 320A-C and second through sixth small cells 340B-F. The first small cell 340A may send the speed measurement generated in step S410 to other eNBs using, for example, the known X2 interface.

In step S430, the small cell eNB 340A receives one or more other speed measurements from one or more other eNBs. For example, the first small cell 340A may receive the one or more other speed measurements from any or all of the first through fourth macro cells 320A-C and second through sixth small cells 340B-F. The first small cell 340A may receive the one or more other speed measurements from other eNBs using, for example, the known X2 interface.

In step S440, the first small cell eNB 340A determines the mobility state of the UE 310 based on the UE speed measurements including the UE speed measurement generated by the first small cell 340A in step S410 and the UE speed measurements received by the first small cell 340A in step S420. For example, the first small cell eNB 340A may compare the UE speed measurements to each other, choose a highest of the UE speed measurements, and determine the highest UE speed measurement to be the UE speed measurement which represents the mobility state of the UE 310.

Accordingly, in the event the accuracy of the radial speed measurement obtained by the first small cell eNB 340A is reduced due to the approach angle of the UE being at or near 90° for the first small cell 340A, in accordance with the method described above with reference to FIG. 4, the first small cell 340A will have access to one or more additional, more accurate, speed measurements from other cells in the wireless communications network 300. Consequently, the first small cell eNB 340A will still be able to obtain an accurate mobility state estimation.

Figure 5:
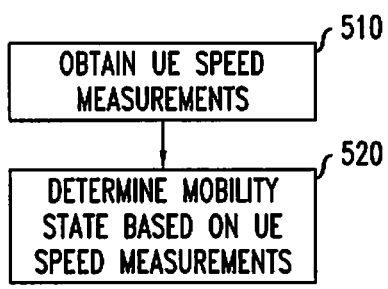
FIG. 5 is a flow chart illustrating a method of estimating the mobility state of a UE at a UE using coordinated speed estimation in accordance with at least one example embodiment.

In the example method discussed above with reference to FIG. 4, the mobility state estimation is performed by an eNB. However according to at least one example embodiment, the mobility state estimation may be performed at a UE. For example, FIG. 5 is a flow chart illustrating a method of estimating the mobility state of a UE at an eNB using coordinated speed estimation in accordance with at least one example embodiment. FIG. 5 will be discussed below with reference to the UE 310.

Referring to FIG. 5, in step S510, the UE 310 obtains a plurality of UE speed measurements. For example, in accordance with at least one example embodiment, one or more cells in the wireless communications network 300 may generate speed measurements by measuring a speed of the UE 310 using known Doppler spread techniques. The one or more cells that measured the UE 310 may then send the generated speed measurements to the UE 310. Accordingly, in step S510, the UE 310 may obtain the plurality of UE speed measurements by receiving the UE speed measurements from cells in the wireless communications network 300.

According to at least one example embodiment, the UE 310, itself, is capable of measuring its own radial speed with reference to one or more cells using, for example, synchronization signals PSS or SSS, in accordance with known Doppler spread techniques. Accordingly, in step S510, alternatively or in addition to obtaining UE speed measurements generated by, and sent from, cells in the wireless communications network 300 in the manner discussed above, the UE 310 is capable of generating speed measurements itself. Accordingly, in step S510, the UE 310 may obtain the plurality of UE speed measurements by generating the UE speed measurements based on radial speed measurements performed at the UE 310 with reference to one or more cells within the wireless communications network 300 using known Doppler spread techniques.

Further, in accordance with at least one example embodiment, in step S510, the UE 310 may obtain the plurality of UE speed measurements by using a combination of i) UE speed measurements generated by, and received from, one or more cells, and ii) UE speed measurements measured by the UE 310, itself, with reference to one or more cells.

In step S520, the UE 310 determines its mobility state based on the UE speed measurements obtained in step S5510. For example, the UE 310 may compare the obtained UE speed measurements to each other, choose a highest of the obtained UE speed measurements, and determine the highest UE speed measurement to be the UE speed measurement which represents the mobility state of the UE 310.

Accordingly, in the event the accuracy of a radial speed measurement obtained by the UE 310 with respect to a given cell is reduced due to the approach angle of the UE being at or near 90° for the given cell, in accordance with the method described above with reference to FIG. 5, the UE 310 will have access to one or more additional, more accurate, speed measurements corresponding to other cells in the wireless communications network 300. Consequently, the UE 310 will still be able to obtain an accurate mobility state estimation.

Enhancing Multi-Node Coordinated Speed Estimation Using Spatial Information

Figure 6:
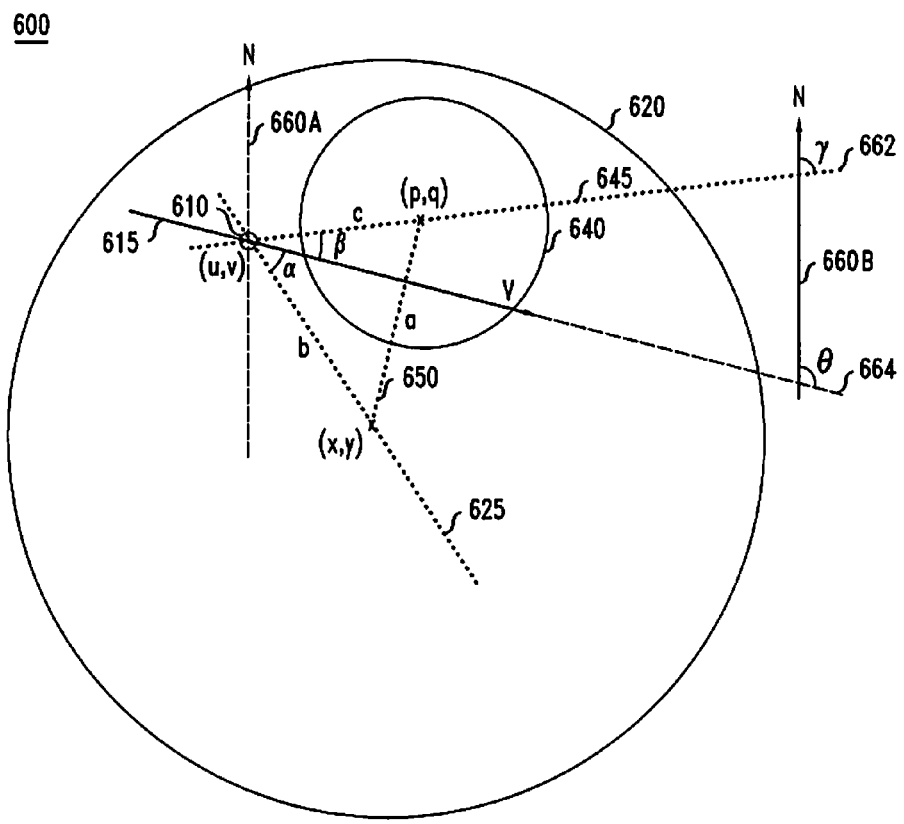
FIG. 6 is a diagram for explaining an enhancement of the multi-node coordinated speed estimation using spatial information according to at least one example embodiment.

FIG. 6 is a diagram for explaining the enhancement of multi-node coordinated speed estimation using spatial information according to at least one example embodiment. FIG. 6 illustrates a portion of a wireless communications network 600 in accordance with example embodiments. The wireless communications network 600 may follow, for example, the LTE protocol. The wireless communications network is a HetNet which includes both a macro cell 620 and small cells 640. Each of small cells 340A-F may be, for example, a femto cell or a pico cell. The wireless communication network 300 may also include a plurality of UEs including the UE 610.

The UE 610 is located at a position (u,v) and is moving at a velocity V in a direction represented by the arrow of the line 615. The macro cell 620 and the small cell 640 are both capable of measuring a radial speed of the UE 610 using Doppler spread techniques in accordance with known methods. The point (x,y) represents the spatial position used to measure radial speed of the UE 610 with respect to the macro cell 620, and the point (p,q) represents the spatial position used to measure radial speed of the UE 610 with respect to the small cell 640. The points (x,y) and (p,q) may be, for example, the spatial locations of the eNBs corresponding to macro cell 620 and the small cell 640, respectively. Line 625 represents a line of sight between the point (x,y) of the macro cell 620 and the UE 610. Line 645 represents a line of sight between the point (p,q) of the small cell 640 and the UE 610. Line 650 represents a line of sight between the points (x,y) and (p,q).

Line segment a, included in the line 650, represents a distance between the points (x.y) and (p,q). Line segment b, included in the line 625, represents a distance between points (u,v,) and (x,y). Line segment c, included in the line 645, represents a distance between points (u,v,) and (p,q). FIG. 6 illustrates a reference direction N which is represented by the arrows of a lines 660A and 660B.

Line 615 intersects with the reference direction N at an angle $\theta$, referred to herein as the first angle 664. Further, as is illustrated by line 660B, line of sight 645 intersects with the reference direction N at angle $\gamma$, referred to herein as the small cell angle of arrival 662. The small cell angle of arrival 662 is the angle between a direction of signals arriving at measurement position (p,q) of the small cell 640 from the UE 610 (or a direction of signals arriving at the UE 610 from the measurement position (p,q) of the small cell 640) and the reference direction N. Further, though, for the purpose of simplicity, only the small cell angle of arrival 662 between the UE 610 and the small cell 640 is illustrated in FIG. 6, a macro cell angle of arrival exists between the UE 610 and the macro cell 620 as well. The macro cell angle of arrival 662 is the angle between a direction of signals arriving at the measurement position (x,y) of the macro cell 620 from the UE 610 (or a direction of signals arriving at the UE 610 from the measurement position (x,y) of the macro cell 620) and the reference direction N. The angles of arrival discussed above may also be referred to as angles of departure when referring to a direction of signals departing a reference point, like an eNB or UE, as opposed to the direction of signals arriving at a reference point.

According to at least one example embodiment, an operator of the wireless network 600 knows the spatial information associated with one or more of the cells in the wireless network 600 including, for example, the position (u,v) of the UE 610 and the measurement positions (x,y) and (p,q) of the macro cell 620 and the small cell 640. According to known methods, the wireless network 600 can also determine the small cell angle of arrival 662 between the UE 610 and the small cell 640, and the macro cell angle of arrival between the UE 610 and the macro cell 620. For example, the angle of arrival 663 may be determined at the UE 610 or the small cell 640 in accordance with known methods. According to at least one example embodiment, spatial information regarding the measurement positions of a UE and cells may be shared throughout the wireless network 600 in order to enhance the ability of the cells and/or a UE to accurately estimate a speed, or mobility state, of the UE. For example, at any given instant, using an angle of arrival or departure between the UE 310 and a cell, and spatial information regarding a location of the macro cell 620 and the small cell 640, the angle ($\alpha+\beta$) can be found using known triangulation techniques.

For example, the distances a, b, and c can be calculated using equations (1)-(3) below:

$$a=((x-p)^2+(y-q)^2)^{0.5}, \quad (1)$$

$$b=((x-u)^2+(y-v)^2)^{0.5}, \quad (2)$$

$$c=((u-p)^2+(v-q)^2)^{0.5}. \quad (3)$$

Further, the angle $\beta$ can be calculated using equation (4) below:

$$\beta=|\theta-\gamma|,$$

where $\gamma$ is the small cell angle of arrival 662 and $\theta$ (664) is the angle between the reference direction N and the mobile moving direction (615). As is discussed above, the small cell angle of arrival 662 can be calculated at the UE 610 (based on a direction of signals arriving at the UE from the small cell 640) or at the small cell 640 (based on a direction of signals arriving at the small cell 640 from the UE 610), in accordance with known methods. Further, the small cell angle of arrival 662 calculated based on the knowledge of the position (u,v) of the UE 610 and the measurement position (p,q) of the small cell 662.

Similarly, the angle $\alpha$ may be calculated in the same manner as that described above for the angle $\beta$ using, instead, the position of the UE 610, the position (x,y) of the macro cell 620, and the macro cell angle of arrival.

Alternatively, once the angle $\beta$ (or, alternatively, $\alpha$) is determined, the remaining of the two angles, angle $\alpha$ (or, alternatively, $\beta$) may be derived from the following equation:

$$\cos(\alpha+\beta) = \frac{a^2 - b^2 - c^2}{2bc} \quad (5)$$

Accordingly, the radial speed of the UE 610 with reference to the macro cell 620, Vmacro, may be defined as (V cos($\alpha$)). Similarly, the radial speed of the UE 610 with reference to the small cell 640, Vsmall, may be defined as (V cos($\beta$)). Consequently, the direction of the velocity V at which the UE 610 is traveling can be determined based on the angles $\alpha$ and/or $\beta$, calculated in accordance with equations (1)-(5) discussed above, and the magnitude of the velocity V can be calculated in accordance equation (1) below:

$$V = \frac{Vmacro}{\cos(\alpha)} = \frac{Vsmall}{\cos(\beta)}. \quad (6)$$

The calculations discussed above for determining the direction and magnitude of the velocity V of the UE 610 may be performed at either or both of the macro cell 620 and the small cell 640. For example, the wireless communications network 600 may provide each of the macro cell 620 and the small cell 640 with spatial information identifying the locations of some or all of the other cells in the wireless communications network 600.

According to at least one example embodiment, as an alternative, or in addition, to calculating the velocity V at one or both of the macro cell 620 and the small cell 640 in the manner discussed above, the velocity V may be calculated at another network node including, for example an MME (not pictured). For example, the wireless communications network 600 may provide the MME with spatial information identifying the locations of some or all of the other cells in the wireless communications network 600, including the macro cell 620 and the small cell 640. Further, one or both of the macro cell 620 and the small cell 640 may generate, and provide to the MME, measurements of the radial speed of the UE 610 for the MME to use in calculating the velocity V of the UE 610. Additionally, one or both of the macro cell 620 and the small cell 640 may calculate, and send to the MME, the angles $\alpha$ and $\beta$ for the MME to use in calculating the velocity V of the UE 610. Alternatively, one or both of the macro cell 620 and the small cell 640 may determine, and send to the MME, the small cell angle of arrival 662 and/or macro cell angle of arrival so the MME can calculate the angles $\alpha$ and/or $\beta$ for the MME to use in calculating the velocity V of the UE 610.

According to at least one example embodiment, as an alternative, or in addition, to calculating the velocity V at any or all of the macro cell 620, the small cell 640, and another network node including, for example, the MME, the velocity V may be calculated at the UE 610. For example, according to at least one example embodiment, one or both of the macro cell 620 and the small cell 640 may provide the UE 610 with corresponding spatial information which the UE can use to determine one or both of the angles $\alpha$ and $\beta$. Alternatively, one or both of the angles $\alpha$ and $\beta$ can be provided to the UE 610 by one or both of the macro cell 620 and the small cell 640. Further, one or both of the macro cell 620 and the small cell 640 may provide measurements of the radial speed of the UE 610 to the UE 610. Alternatively, the UE 610 may be capable of measuring its own radial speed relative to one or both of the macro cell 620 and the small cell 640. Thus, according to at least one example embodiment, after obtaining radial speed Vmacro and the angle $\alpha$, or the radial speed Vsmall and the angle $\beta$, the UE 610 can calculate its own velocity V, for example, using equation (6) above.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of determining a mobility state of a user equipment (UE) in a wireless communications network, the method comprising:
   obtaining, at a first device, a first speed measurement, the first speed measurement being a measurement of a radial speed of the UE relative to a first network element;

obtaining, at the first device, one or more second speed measurements corresponding, respectively, to one or more second network elements, each of the one or more second speed measurements being a measurement of a radial speed of the UE relative to the corresponding one of the one or more second network elements;

generating, at the first device, a comparison result based on the first speed measurement and the one or more second speed measurements; and determining the mobility state of the UE based on the comparison result.

2. The method of claim 1, wherein the first device is the first network element, and the first network element and the one or more second network elements are each enhanced Node Bs (eNB)s.

3. The method of claim 2, wherein the generating a comparison result includes selecting a largest speed measurement from among the first speed measurement and the one or more second speed measurements, and the determining the mobility state of the UE includes determining the mobility state of the UE to be a speed indicated by the selected speed measurement.

4. The method of claim 2, wherein the obtaining a first speed measurement includes generating the first speed measurement by measuring the radial speed of the UE at the first network element, and the obtaining one or more second speed measurements includes, for each of the one or more second speed measurements, receiving the second speed measurement at the first network element from the corresponding one of the one or more second network elements.

5. The method of claim 1, wherein the first device is the UE, and the first network element and the one or more second network elements are each enhanced Node Bs (eNB)s.

6. The method of claim 5, wherein the generating a comparison result includes selecting a largest speed measurement from among the first speed measurement and the one or more second speed measurements, and the determining the mobility state of the UE includes determining the mobility state of the UE to be a speed indicated by the selected speed measurement.

7. The method of claim 5, wherein the obtaining a first speed measurement includes generating the first speed measurement by measuring, at the UE, the radial speed of the UE relative to the first network element, and the obtaining one or more second speed measurements includes, for each of the one or more second speed measurements, generating the second speed measurement by measuring, at the UE, the radial speed of the UE relative to the second network element that corresponds to the second speed measurement.

8. The method of claim 5, wherein the obtaining a first speed measurement includes receiving the first speed measurement, at the UE, from the first network element, and the obtaining one or more second speed measurements includes, for each of the one or more second speed measurements, receiving the second speed measurement at the UE from the second network element that corresponds to the second speed measurement.

9. A method of determining a velocity of a user equipment (UE) in a communications network, the method comprising:

obtaining, at a first device, a first angle $\beta$, the first angle $\beta$ being an angle between a first line and a direction of the velocity of the UE, the first line being a line of sight between a position of the UE and a position of a network element;

obtaining, at the first device, a radial speed of the UE relative to the network element; and determining, at the first device, the velocity of the UE based on the radial speed and the first angle $\beta$.

10. The method of claim 9, wherein the first device is the network element, and the network element is an enhanced Node B (eNB).

11. The method of claim 10, further comprising:

receiving, at the network element, spatial information indicating a position of the UE, wherein the first angle $\beta$ is generated based on a position of the network element and the position of the UE.

12. The method of claim 10, wherein the obtaining a radial speed of the UE includes measuring, at the network element, the radial speed of the UE relative to the network element.

13. The method of claim 9, wherein the first device is the UE.

14. The method of claim 13, further comprising:

receiving, at the UE, spatial information indicating a position of the network element, wherein the first angle $\beta$ is generated based on a position of the UE and the position of the network element.

15. A communications device comprising:

a processor configured to control operations for determining a mobility state of a user equipment (UE) in a communications network, the operations including, obtaining, at the communications device, a first speed measurement, the first speed measurement being a measurement of a radial speed of the UE relative to a first network element;

obtaining, at the communications device, one or more second speed measurements corresponding, respectively, to one or more second network elements, each of the one or more second speed measurements being a measurement of a radial speed of the UE relative to the corresponding one of the one or more second network elements;

generating, at the communications device, a comparison result based on the first speed measurement and the one or more second speed measurements; and determining the mobility state of the UE based on the comparison result.

16. The communications device of claim 15, wherein the communications device is the first network element, and the first network element and the one or more second network elements are each enhanced Node Bs (eNB)s.

17. The communications device of claim 15, wherein the communications device is the UE, and the first network element and the one or more second network elements are each enhanced Node Bs (eNB)s.

18. A communications device comprising:

a processor configured to control operations for determining a velocity of a user equipment (UE) in a communications network, the operations including, obtaining, at the communications device, a first angle $\beta$, the first angle $\beta$ being an angle between a first line and a direction of the velocity of the UE, the first line being a line of sight between a position of the UE and a position of a network element;

obtaining, at the communications device, a radial speed of the UE relative to the network element; and determining, at the communications device, the velocity of the UE based on the radial speed and the first angle $\beta$.

19. The communications device of claim 18, wherein the communications device is the network element, and the network element is an enhanced Node B (eNB).

20. The communications device of claim 18, wherein the communications device is the UE.

\* \* \* \* \*